Feb. 7, 1928.
R. S. PHILEN
ULLAGE ROD
1,658,536
Filed Jan. 7, 1926
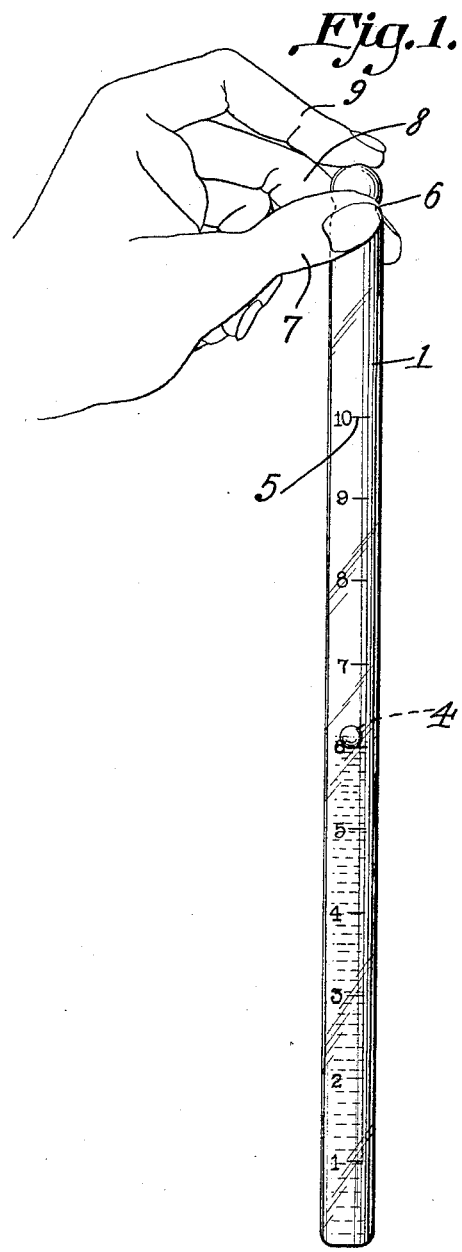
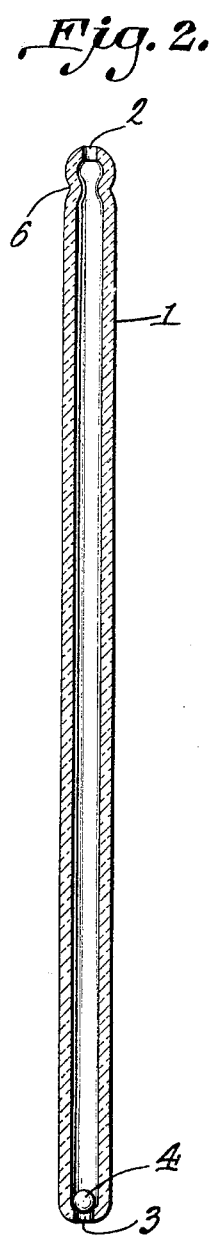
R. S. Philen Inventor
By C A Snow & Co.
Attorneys Patented Feb. 7, 1928.

1,658,536

UNITED STATES PATENT OFFICE.

RICHARD SIDNEY PHILEN, OF LUFKIN, TEXAS.

ULLAGE ROD.

Application filed January 7, 1926. Serial No. 79,851.

This invention aims to provide a simple means whereby the depth of the liquid in a gasoline tank on a car, or in any other container, may be ascertained without difficulty, and with reasonable accuracy.

It is within the province of the disclosure to improve generally and to enhance the utility of devices of that type to which the invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in elevation, a device constructed in accordance with the invention; and Figure 2 is a longitudinal section.

In carrying out the invention, there is provided an elongated tubular body 1, preferably made of glass or other transparent material, the body 1 being provided in its upper end with a reduced opening 2, and being supplied in its lower end with a reduced opening 3. A buoyant indicator 4 is movable within the body 1, the size of the openings 2 and 3 being such that the indicator or float 4 cannot drop out of the body. The body 1 carries an external scale 5, which may be constructed as desired. Adjacent to its upper end, the body 1 has a circumferential seat 6.

In practical operation, the thumb 7 of a human hand, and the second finger 8, are engaged in the seat 6, the seat enabling the operator to secure a firm hold on the body 1, whilst the index finger 9 is pressed down on the end of the body 1, to close the opening 2. The opening 2, however, is uncovered when the body 1 is thrust downwardly into the liquid, the liquid rising in the body 1 through the opening 3, the indicator 4 sloping on the liquid. The opening 2 is closed in the way hereinbefore described, and the body 2 is lifted out of the tank or other container, and the operator, by noting the position of the indicator 4 with respect to the scale 5, can ascertain at a glance how much liquid there is in the tank.

After the operator has made the necessary observations, the finger 9 is lifted off the hole 2, whereupon the liquid will run out through the hole 3.

What is claimed is:—

In a device of the class described, an elongated tube having a longitudinal scale, the tube having integral upper and lower end portions provided with reduced openings, and a float located within the tube and adapted to cooperate with the scale, the opening in the upper end of the tube being adapted to be stopped by one finger of the human hand, the tube being constricted at a point adjacent to its upper end, to form a circumferential seat adapted to receive two other fingers of the same hand to enhance the hold of those fingers on the tube and to prevent the tube from being pushed out of the hand when pressure is applied by the third finger during the aforesaid stopping of the upper opening.

In testimony that I claim the foregoing as my own, I have hereto affixed my signature.

RICHARD SIDNEY PHILEN.